(12) United States Patent
Dornbach

(10) Patent No.: US 11,717,990 B2
(45) Date of Patent: Aug. 8, 2023

(54) PREFORM FOR PRODUCTION OF A PLASTIC CONTAINER IN A STRETCH-BLOW-MOLDING METHOD

(71) Applicant: ALPLA WERKE ALWIN LEHNER GMBH & CO. KG, Hard (AT)

(72) Inventor: Christian Dornbach, Fussach (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 748 days.

(21) Appl. No.: 15/766,996

(22) PCT Filed: Oct. 5, 2016

(86) PCT No.: PCT/EP2016/073781
§ 371 (c)(1),
(2) Date: Apr. 9, 2018

(87) PCT Pub. No.: WO2017/060293
PCT Pub. Date: Apr. 13, 2017

(65) Prior Publication Data
US 2018/0304495 A1    Oct. 25, 2018

(30) Foreign Application Priority Data
Oct. 8, 2015   (CH) ..................... 1462/15

(51) Int. Cl.
*B29B 11/00* (2006.01)
*B29B 11/14* (2006.01)
(Continued)

(52) U.S. Cl.
CPC ............ *B29B 11/14* (2013.01); *B65D 1/0261* (2013.01); *B65D 1/0276* (2013.01);
(Continued)

(58) Field of Classification Search
None
See application file for complete search history.

(56) References Cited

U.S. PATENT DOCUMENTS 3,984,498 A * 10/1976 McChesney ............ B29C 49/00
525/230
4,044,086 A * 8/1977 McChesney ........ B29C 49/0073
264/520
(Continued)

FOREIGN PATENT DOCUMENTS

EP    1063076 A1    12/2000
JP    04193505 A *  7/1992 ........... B65D 1/0223
(Continued)

OTHER PUBLICATIONS

Suzuki et al., machine translation of JP H04-193505 Abstract and Description, Jul. 13, 1992 (Year: 1992).*
(Continued)

*Primary Examiner* — Mary I Omori
(74) *Attorney, Agent, or Firm* — Buchanan Ingersoll & Rooney PC

(57) ABSTRACT

A preform for a stretch-blow-molded plastic container includes an elongated, tube-like preform body. An outer wall and an inner wall delimit a bottom thickness (b). An outer wall and an inner wall delimit a wall thickness (w). An inner surface and an outer surface (E1) curved in three-dimensionally convex manners are spaced apart such that a distance from their respective apex (S, S') to the preform body continuously increases. Extensions of the outer wall of the preform bottom along the outer three-dimensionally curved surface (E1), and of the inner wall of the preform bottom along the inner three-dimensionally curved surface (E2) are configured to be interrupted by set-backs area outside of their respective apex (S, S') thereof.

17 Claims, 4 Drawing Sheets

(51) Int. Cl.
    *B65D 1/02*     (2006.01)
    *B65D 1/46*     (2006.01)
    *B29C 49/06*     (2006.01)
    *B29C 49/12*     (2006.01)

(52) U.S. Cl.
    CPC ............. *B65D 1/0284* (2013.01); *B65D 1/46* (2013.01); *B29C 49/06* (2013.01); *B29C 49/12* (2013.01); *B29C 2949/078* (2022.05); *B29C 2949/0724* (2022.05); *B29C 2949/0725* (2022.05); *B29C 2949/0818* (2022.05)

(56) References Cited

U.S. PATENT DOCUMENTS

| | | | |
|---|---|---|---|
| 4,885,197 A * | 12/1989 | Strassheimer | B29C 49/0078 428/36.92 |
| 4,927,679 A | 5/1990 | Beck | |
| 5,160,059 A | 11/1992 | Collette et al. | |
| 5,455,088 A * | 10/1995 | Deemer | B29B 11/08 428/35.7 |
| 5,599,496 A * | 2/1997 | Krishnakumar | B29C 49/0073 264/532 |
| 5,614,148 A | 3/1997 | Beck et al. | |
| 5,714,111 A * | 2/1998 | Beck | B29C 49/0073 215/375 |
| 5,913,438 A | 6/1999 | Beck et al. | |
| 2009/0266785 A1* | 10/2009 | Siegl | B29B 11/08 215/382 |
| 2010/0304168 A1* | 12/2010 | Dornbach | B29B 11/14 428/542.8 |
| 2010/0304169 A1* | 12/2010 | Dornbach | B29B 11/14 428/542.8 |
| 2012/0231191 A1* | 9/2012 | Siegl | B29B 11/14 428/35.7 |
| 2013/0134124 A1* | 5/2013 | Rashid | B65D 1/0261 215/379 |
| 2016/0250795 A1* | 9/2016 | Knight | B29B 11/14 215/44 |
| 2018/0305064 A1* | 10/2018 | Lane | B65D 1/0276 |

FOREIGN PATENT DOCUMENTS

| | | | | |
|---|---|---|---|---|
| JP | 2008178994 A | 8/2008 | | |
| WO | WO 90/04543 A1 | 5/1990 | | |
| WO | WO 96/24482 A1 | 8/1996 | | |
| WO | WO 2010/058098 A2 | 5/2010 | | |
| WO | WO-2010069042 A1 * | 6/2010 | ............. | B29B 11/14 |
| WO | WO 2011/103296 A2 | 8/2011 | | |
| WO | WO 2011/109623 A2 | 9/2011 | | |
| WO | WO-2015036596 A1 * | 3/2015 | ............. | B29C 49/02 |
| WO | WO-2017065803 A1 * | 4/2017 | ............. | B29C 49/06 |

OTHER PUBLICATIONS

International Search Report (PCT/ISA/210) dated Dec. 9, 2016, by the European Patent Office as the International Searching Authority for International Application No. PCT/EP2016/073781.
Written Opinion (PCT/ISA/237) dated Dec. 9, 2016, by the European Patent Office as the International Searching Authority for International Application No. PCT/EP2016/073781.
International Search Report (Form PCT/ISA/201) dated Jan. 22, 2016, by the European Patent Office in corresponding International Application No. CH 14622015 (3 pages).
Office Action dated Jun. 19, 2020, by the European Patent Office in corresponding European Patent Application No. 16 784 809.2. (8 pages).

* cited by examiner

PREFORM FOR PRODUCTION OF A PLASTIC CONTAINER IN A STRETCH-BLOW-MOLDING METHOD

RELATED APPLICATION

This application claims priority as a continuation application under 35 U.S.C. § 120 to PCT/EP2016/073781, which was filed as an International Application on Oct. 5, 2016 designating the U.S., and which claims priority to Swiss Application 1462/15 filed in Switzerland on Oct. 8, 2015. The entire contents of these applications are hereby incorporated by reference in their entireties.

FIELD

The present disclosure relates to a preform for the production of a plastic container in a stretch-blow-molding method.

BACKGROUND INFORMATION

Containers made of tin or multicolored sheet metal, glass or ceramic, common in the past, are increasingly being replaced by containers made of plastic. Primarily plastic containers are now being used in particular for the packaging of fluid substances, for example beverages, free-flowing foods such as ketchup, sugo, pesto, sauces, mustard, mayonnaise, and the like, household products, bodily care products, cosmetics, etc. The low weight and the lower costs certainly play a significant role in this substitution. The use of recyclable plastic materials, the use of bioplastics, and the overall more advantageous total energy balance in their production also contribute to promoting the acceptance of plastic containers, in particular plastic bottles, by consumers.

A large number of the plastic bottles and similar plastic containers now used are produced in a stretch-blow-molding method. With this method, first a so-called preform with a usually elongated, tube-like shape is produced, which preform is closed with a bottom on one of its longitudinal ends and has a neck section with means for positive clamping of a closure part equipped with corresponding engagement means on the other longitudinal end. The means for positive clamping of a closure part can be, for example, threaded sections made on the outer wall of the neck part or bayonet-like projections or corresponding recesses. In most cases, the production of the preform is carried out in an injection-molding method. However, alternative production methods for preforms are also known, for example impact extrusion or extrusion blow molding. The production of the preforms can be done separated in time and/or space from the subsequent stretch-blow-molding method. In an alternative method, the preform that is produced is further processed immediately after its production without interim cooling. For stretch blow molding, the preform is inserted into a mold cavity of a blow mold and in particular inflated by a fluid, usually air, which is introduced with overpressure, expanded in the radial and axial directions. In this case, the preform is stretched in the axial direction in addition with an elongated mandrel that is run-in through the neck opening of the preform. After the elongation/blow-molding process, the finished plastic container is demolded from the blow mold.

The single- or multi-layer preform is usually produced in a separate injection-molding method before the stretch-blow-molding method. It has also already been proposed to produce preforms in a plastic impact-extrusion method or in an extrusion-blow-molding method. As raw materials for the production of preforms, materials are used whose main component (e.g., 90% and more) can consist of, for example, PET, PET-G, HDPE, PP, PS, PVC, PEN, copolymers of the cited plastics, bioplastics, such as, for example, PLA or PEF, filled plastics and/or mixtures of the above-mentioned plastics. The plastics or parts thereof can be dyed and/or coated. A consideration for the usable plastics is the suitability thereof, on the one hand, for the respective production method of the preform (e.g., for the injection molding or the impact extrusion or the extrusion blow molding) and, on the other hand, for the subsequent stretch-blow-molding method.

Depending on the specifications, plastic containers can be produced specifically with greater or smaller wall thicknesses in different areas of the container neck, the container body and/or the container bottom. Such thick or thin spots, for example in the container wall or in the container bottom, can be achieved by a targeted local heating of the preform before the further processing in the stretch-blow-molding method. To this end, the preform is inserted into, for example, an oven in order to impress upon it a desired temperature profile. Methods in which the preform is first heated uniformly are also already known. The desired temperature profile is then created by a targeted local cooling of the preform. During the stretch-blow-molding method, cooler spots in the preform generally form thick spots in the plastic container, while more greatly heated spots in the preform usually result in thin spots in the plastic container. As an alternative, or in addition, the preform can also be cooled in a targeted manner during the stretch-blow-molding method within the blow mold, in order to achieve locally an increased or reduced wall thickness based on the temperature-dependent, different-size stretchability in the finished stretch-blow-molded plastic container.

Specifically, the bottom area of a plastic container can be subject to extremely varied specifications. For example, feet formed in the bottom area are intended to ensure a stable upright positioning of the filled plastic container. In addition, the feet are intended to develop an appropriate resistance to counteract mushrooming in case a table plate falls. Accordingly, the feet of the plastic container, for example on its transition to the container body, are not to have any smaller wall thicknesses compared to their neighboring areas. On the other hand, the container bottom is often used for a compensation for volume changes within the plastic container, so that the container body does not sustain deformations. In a stretch-blow-molded plastic container, namely relatively high underpressure can develop because of chemical and physical effects, which underpressure can optically disadvantageously deform the plastic container, for example a plastic flask. This underpressure is produced by, for example, the cooling and the concentrating of a hot liquid that is decanted into the plastic container, when the plastic container is closed in a gas-tight manner right after it is filled. Also, an overpressure can be produced in the container neck or in the header of the container shortly after decanting, for example owing to evaporation of the liquid, outgassing of the product, or an increased temperature of the filling material. After the cooling of the container, however, in most cases an underpressure results, since the gases in the header and the filling material itself greatly alter the volumes thereof, in particular reducing them, because of the temperature difference. Different solubilities of specific gases at different temperatures or oxidation reactions of the oxygen with the decanted product can also result in a development of an underpressure. The volume contraction during phase shift from vapor to water is especially intensive. As was already mentioned, this underpressure often leads to a deformation of the plastic container. Deformed bottles or cans often falsely suggest to the consumer an inferior quality and are therefore in many cases not accepted and remain on the shelf.

In order to confront the possible deformation of the container body by underpressure or overpressure inside the container, it has been proposed to make the bottom of the plastic container flexible. In this way, the function of the targeted deformation by underpressure from the container body is to be integrated into the container bottom. In order to obtain a flexible bottom, it is proposed in WO 2010/058098 A2, for example, to move the bottom of the blow mold in an axially jerky manner during the blow-molding process of the plastic container. As a result, the container bottom is to be weakened in places and is to be deformed in a targeted manner around its center in particular in one area. Because of the axially movable bottom, the blow-molding tool and the production process for the plastic container are considerably more expensive.

In WO 2011/103296 A2 or in WO 2011/109623 A2, it is proposed in turn, during the blow-molding process, to mold fins and/or ridges in the container bottom that, because of the targeted material strengthening or material weakening, are intended to produce axially flexible areas in the container bottom. Also, these proposed solutions involve specially designed blow molds, since during the stretch-blow-molding method, specifically the center area of the plastic container, in which the stretching rod touches the container bottom, is stretched too little, and consequently, the material is especially thick-walled all around. In turn, this thick-walled area stands in the way of efforts to design a flexible area in the container bottom. Therefore, these efforts of the state of the art cannot be expected to yield much success, or they will result in increased expense in the configuration of the blow molds or in the process control, and thus in increased production costs for the plastic container.

A possible weak spot of the container bottom also represents in particular the feed point of the preform, which can be located in the center of the preform bottom. During blow molding, in particular stretch blow molding, of the preform to form a container, the latter is only very slightly stretched. As a result, the container bottom has an often only relatively small strength specifically in this area. This is counteracted in many cases in that the preform bottom is designed with a relatively large wall thickness compared to the other preform areas. The large wall thicknesses can lead to problems in production, in particular during injection molding of the preform. In addition, the costs of the preform and thus of the container that is stretch blow molded therefrom are increased by the greater use of material.

SUMMARY

A preform is disclosed for production of a plastic container in a stretch-blow-molding method, the preform comprising: an elongated, tube-like preform body, which is closed with a preform bottom on one of its longitudinal ends and whose other longitudinal end adjoins a transition area, to which a preform neck connects, whereby the preform bottom has an outer wall and an inner wall, which delimit a bottom thickness (b), whereby the preform body has an outer wall and an inner wall that delimit a wall thickness (w), wherein: an inner surface (E2) that is curved in a three-dimensionally convex manner and an outer surface (E1) that is curved in a three-dimensionally convex manner are spaced apart from one another such that a distance from their respective apex (S, S') to the preform body continuously increases, whereby an extension of the outer wall of the preform bottom along the outer three-dimensionally curved surface (E1) is configured to be interrupted by a set-back area outside of the apex (S) thereof, and whereby an extension of the inner wall of the preform bottom along the inner three-dimensionally curved surface (E2) is configured to be interrupted by a set-back area outside of the apex (S') thereof.

A plastic container is also disclosed with a container body, comprising: one longitudinal end closed with a container bottom, another longitudinal end having a container neck, the container being a stretch-blow-molded container configured from a preform, wherein the preform includes: an elongated, tube-like preform body, which is closed with a preform bottom on one of its longitudinal ends and whose other longitudinal end adjoins a transition area, to which a preform neck connects, whereby the preform bottom has an outer wall and an inner wall, which delimit a bottom thickness (b), whereby the preform body has an outer wall and an inner wall that delimit a wall thickness (w), wherein: an inner surface (E2) that is curved in a three-dimensionally convex manner and an outer surface (E1) that is curved in a three-dimensionally convex manner are spaced apart from one another such that a distance from their respective apex (S, S') to the preform body continuously increases, whereby an extension of the outer wall of the preform bottom along the outer three-dimensionally curved surface (E1) is configured to be interrupted by a set-back area outside of the apex (S) thereof, and whereby an extension of the inner wall of the preform bottom along the inner three-dimensionally curved surface (E2) is configured to be interrupted by a set-back area outside of the apex (S') thereof; and wherein at a transition to the container body, the container bottom has a wall thickness that is essentially the same or greater than a wall thickness of the container body.

BRIEF DESCRIPTION OF THE DRAWINGS

Other advantages and features will become apparent from the following description of schematics of exemplary embodiments as disclosed herein. To enhance understanding, similar parts are each provided with the same reference numbers for schematic figures which are not to scale in the following figures, wherein.

DETAILED DESCRIPTION

Figure 1:
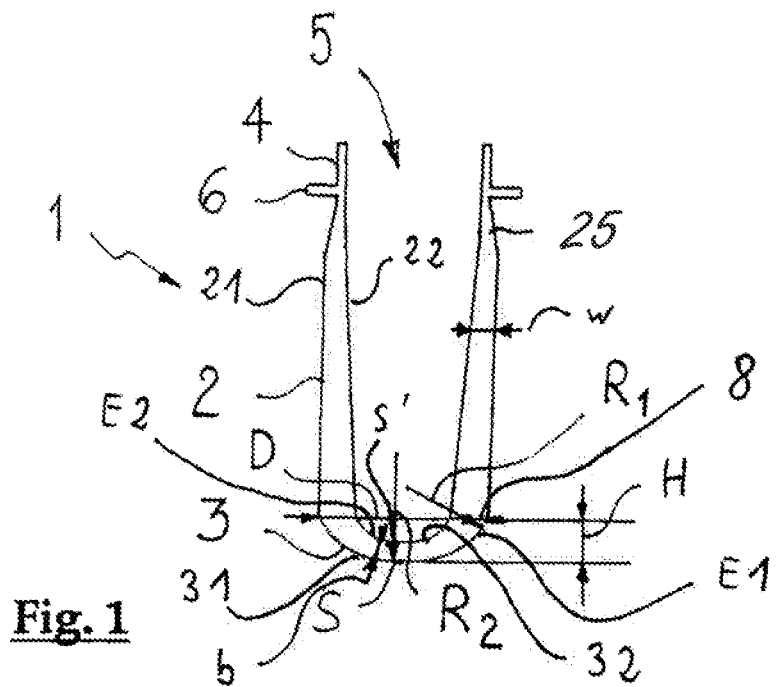
FIG. 1 shows an axial cutaway preform according to an exemplary embodiment for a stretch-blow-molding method with a flat bottom.

A preform as disclosed herein makes it possible to blow mold a plastic container from it, whose container body and container bottom have a wall thickness that is largely constant.

According to an exemplary configuration, a preform is disclosed for the production of a plastic container in a stretch-blow-molding method with an elongated, tube-like preform body, which is closed with a preform bottom on one of its longitudinal ends and whose other longitudinal end adjoins a transition area, to which a preform neck connects. The preform body has an outer wall and an inner wall, which delimit a bottom thickness. The preform body also has an outer wall and an inner wall that delimit a wall thickness. An inner surface that is curved in a three-dimensionally convex manner and an outer surface that is curved in a three-dimensionally convex manner are spaced apart from one another in such a way that the distance from their respective apex to the preform body continuously increases. An extension of the outer wall of the preform bottom along the outer three-dimensionally curved surface can be interrupted or is interrupted by a set-back area outside of the apex thereof. An extension of the inner wall of the preform bottom along the inner three-dimensionally curved surface can be interrupted or is interrupted by a set-back area outside of the apex thereof.

In terms of the present disclosure, the term "continuously" is defined as no abrupt changes in bottom thicknesses such as cracks, steps, ledges, bends or the like being present. Set-back areas result in a reduction of the bottom thickness. Set-back areas in general do not extend over the apex. The term "convex" is defined as the dome-shaped configuration of the preform bottom extending away from the preform neck. Apex is defined as the intersection of the inner, or the outer, surface that is curved in a three-dimensionally convex manner with the center axis of the preform. In general, the set-back areas do not extend over the apex. Should a set-back area be present in the apex, another set-back area is correspondingly present outside of the apex. No set-back area is provided adjoining the preform body.

In terms of this disclosure, a "three-dimensionally curved surface" is defined as any line extending along the plane in any direction being a curve. The three-dimensionally curved surface can be designed, for example, as a sphere or an ellipsoid. The extension of the preform bottom, the preform body, and the transition area correspond to the container bottom, the container body and the container shoulder. As such, the preform bottom ends at the spot at which the container bottom ends. The preform body correspondingly forms the container body, and the container shoulder is formed from the transition area of the preform.

Exemplary embodiments are based on the principle of designing and configuring a preform in such a way that a container that is stretch blow molded therefrom has a largely constant wall thickness below the neck area (e.g., above the container shoulder, container body and container bottom). In general, the stand area of the container bottom, in particular when the stand area is configured as a container base, is the area that is stretched the most and therefore in general the thinnest area. Because of the proposed continuous increase in the bottom thickness of the preform bottom to the preform body, more material can be provided for stretching so that the container bottom of the finished stretch-blow-molded container can have a bottom thickness that in the area of the standing surface is essentially equal to the adjacent area of the container body. The material distribution in the preform is accordingly based on the shaping and the size of the container that is to be produced therefrom. The preform bottom can already have a wall thickness reduction in areas that are to be designed as thin spots of the container bottom in stretch-blow-molded plastic containers. Correspondingly, bottom areas of the preform with greater wall thicknesses can also produce thick spots on the container bottom. The thin spots and thick spots on the container bottom can be produced in a targeted manner from corresponding reduced-wall-thickness set-back areas provided on the preform bottom, taking into consideration the stretching ratio during stretch blow molding.

The at least one reduced-wall-thickness setback area in the preform bottom can be arranged, for example, in such a way that during stretch blow molding, material from adjoining thicker areas is "removed." In particular, this can result in a decrease in the bottom thickness in the area of the feed point of an injection-molded preform by material being "removed" from the feed point when the preform is stretch blow molded. During stretch blow molding, moreover, the bottom thickness in the feed point can be reduced in a targeted manner and thus the degree of stretching in this bottom area of the preform can be increased. This can have advantages with respect to the barrier properties of the container bottom and can improve its strength. Moreover, the reduction of unnecessary plastic material in the area of the feed point during stretch blow molding of the plastic container overall can allow a material reduction, which can have an advantageous effect on the production costs of the plastic container.

According to another example configuration, the preform bottom can be configured as a flat divergent lens, whereby the divergent lens is bound by the outer wall and the inner wall of the preform bottom. Because of the configuration as a divergent lens, it is possible, in the case of a two-stage stretch-blow-molding method, to keep the preform bottom from being heated excessively in an oven by the incoming radiation. Rather, by the forming as a divergent lens, it can be adjusted how high the portion of the reflected radiation is, which radiation actually penetrates into the preform bottom and heats it.

According to another exemplary configuration of the disclosure, the wall thickness can be continuously reduced from the bottom thickness in the preform body up to the transition area. A transition from the preform bottom to the preform body has no ledge or extension. The outer wall and the inner wall of the preform body include an angle that is, for example, essentially greater than or equal to 2° and less than 90°, preferably less than 15°. The outer wall and the inner wall are essentially straight. The preform body essentially has the shape of a hollow cone.

According to another exemplary configuration of the disclosure, the wall thickness from the bottom thickness in the preform body up to the transition area can be made essentially constant. A transition from the preform bottom to the preform body also has no ledge or extension here. The outer wall and the inner wall of the preform body extend essentially parallel to one another. Since, however, ejection chamfers are possible, preforms whose angles encompassed between the inner wall and the outer wall of the preform body are, for example, less than 2° are also intended to be included between them. The wall thickness of the preform body thus essentially corresponds to the bottom thickness in the transition from the preform bottom to the preform body. The outer wall and the inner wall are essentially straight.

According to another exemplary configuration of the disclosure, a first partial area of the preform body adjoins the preform bottom, and a second partial area of the preform body adjoins the first partial area and the transition area. The wall thickness of the first partial area from the bottom thickness in the preform body up to the second partial area is continuously reduced. The wall thickness in the second partial area is essentially constant and essentially corresponds to the wall thickness of the first partial area in the transition to the second partial area.

The transitions from the preform bottom to the first partial area of the preform body and from the first partial area to the second partial area have no ledges or extensions. Starting from the bottom thickness in the transition to the first partial area of the preform body, the wall thickness of the preform body inside the first partial area tapers continuously up to the second partial area in order to keep the wall thickness essentially constant from there up to the transition area. The outer wall and the inner wall are essentially straight.

According to another exemplary configuration of the disclosure, an area that is set back compared to the outer wall and/or the inner wall of the preform bottom can be designed without undercuts. A wall thickness of the at least one set-back area without undercuts is reduced compared to the bottom thickness of an area of the outer wall and/or inner wall that adjoins the area without undercuts.

An absence of undercuts of the at least one reduced-wall-thickness set-back area of the preform bottom facilitates the production of the preform and its ability to be demolded. In a preform that is injection-molded, for example, complicated injection-molding molds with hollow cores and/or multi-part outer molded parts are therefore eliminated. It is understood that the reduced-wall-thickness set-back areas can be made on the inner wall and/or on the outer wall of the preform bottom.

The area without undercuts can be configured essentially as a point recess or essentially a point set-back or a line recess or a line set-back. The line recesses can be configured as grooves that are made, for example, in the shape of a hollow, rectangle, or V. The line or point recesses can be spaced from one another in a regular or irregular manner. The line recesses themselves can be equal or unequal in length. The line or point recesses can lie on a line with any geometric shape, whereby the line can be closed, such as, for example, a circle, an oval or a polygon, or open, such as, for example, a spiral. Also, the transition from the area without undercuts or set-backs can be essentially sharp-edged or rounded. Also, the set-back can extend centrically or eccentrically around the apex.

In an exemplary variant embodiment, it can be provided that the wall thickness of the at least one set-back area without undercuts has a minimum wall thickness of, for example, approximately 0.7 mm to approximately 4 mm. With such a minimum wall thickness, specifications of the injection-molding method, which is the production method used most often for the production of preforms, can be met. With this minimum wall thickness, the thin spots and material shifts intended on the stretch-blow-molded plastic container can be achieved to a satisfactory extent. For example, the minimum thickness of the container bottom that corresponds to the set-back area of the preform bottom can be, for example, at least approximately 0.15 mm up to approximately 2.5 mm.

It can be provided, for example, that the preform in the preform bottom has at least one set-back area without undercuts, which is configured in an annular, for example, circular, manner. Specifically, in the case of plastic containers with a container bottom that is configured rotationally-symmetrical to a large extent, in this way very uniform material shifts and thinning can be achieved. Also, the annular, for example, circular, set-back area without undercuts can be designed centrically or eccentrically to the apex.

In another exemplary variant embodiment of the preform, the preform bottom can have multiple set-back areas without undercuts, which areas are arranged at least in part along a closed ring in the preform bottom. These can all have the same radial distance from the crown of the preform bottom. A preform bottom that is configured in such a way can be provided, for example for the production of a plastic container, with a container bottom with petaloid feet. The reduced-wall-thickness areas of the preform bottom can then be to thin spots between the petaloid feet. The feet themselves are produced from areas of the preform bottom in which the preform bottom has a greater wall thickness. Correspondingly, the petaloid feet can also have thickenings that can have an advantageous effect on the stiffness thereof.

In another exemplary variant embodiment of the preform, the preform bottom can have multiple set-back areas without undercuts. At least one of the set-back areas without undercuts can be designed in an annular manner in this case. For example, an annular area can be provided around the feed point in the preform bottom, while another set-back area without undercuts can be arranged elsewhere on the preform bottom, but without projecting into the transition to the preform body. With such a configuration, unnecessary excess material can be removed from the feed point in the surrounding areas during the stretch blow molding, and thinning on the container bottom can be prevented in a targeted manner. In this connection, the set-back areas without undercuts can be arranged in any manner inside the preform bottom.

In another exemplary variant embodiment of the preform, the preform bottom can have at least two set-back areas without undercuts that are configured in an annular form, which areas are arranged concentrically in the preform bottom. Such a preform can be used, for example, for the production of a plastic container with a container bottom, which has one or more membrane-like bottom areas that can be deformed by underpressure or overpressure. Here, in the case of the stretch-blow-molded container, the areas of the inner wall and outer wall of the preform bottom, located between the set-back areas without undercuts of the preform body, can form the membrane-like bottom areas, which are connected to one another by thin spots that are configured as hinges. These thin spots that are configured as hinges are formed from the set-back areas without undercuts. Such container bottoms can prevent a deformation of the container body in the case of underpressure or overpressure forming inside the container, since the membrane-like bottom areas between the thin spots that are configured as hinges can be moved essentially along a longitudinal axis of the container. Such a configuration can be suitable for a hot-filling of liquid or pasty products or else for a filling of cold products with subsequent short-term heating.

In another exemplary variant embodiment, the preform bottom can have at least two set-back areas without undercuts, which areas are arranged in a star-shaped manner. In this connection, for example, the container bottom thicknesses in the intermediate spaces between petaloid feet, which in general are stretched less than the feet themselves, can be matched by the set-back areas without undercuts of the preform bottom to the container bottom thicknesses of neighboring areas. For example, in this connection, it is possible that the petaloid foot has the same wall thickness as the intermediate space.

In another exemplary variant embodiment, the preform bottom can be configured as a flat bottom. With respect to the configuration of the reduced-wall-thickness areas without undercuts, it has proven suitable, in particular in the case of its arrangement on an inner wall of the preform bottom, when the preform bottom is configured as a flat bottom. As a flat bottom in terms of this patent application, in this case a preform bottom is referred to, whose first radius of curvature in a transition area from the preform body to the preform bottom is smaller than a second radius of curvature in the other preform bottom. A maximum diameter of the preform bottom is in this case greater than an axial height of the preform bottom, whereby the first radius of curvature is smaller than the axial height of the preform bottom.

According to an exemplary embodiment, the production of the preform is carried out by injection molding, impact extrusion, or extrusion blow molding. The production can also be carried out by injection molding, impact extrusion, extrusion blow molding with subsequent mechanical deformation of the preform bottom.

The preform can be configured in a correspondingly designed form with projections in certain areas and/or annular projections. As an alternative, a more conventional preform, which for example has an unstructured bottom, can also be provided by mechanical deformation with the reduced-wall-thickness area(s) without undercuts. Mechanical deformation of the preform bottom connected to the injection molding or impact extrusion or even extrusion blow molding can be carried out by, for example, embossing or else cutting. The preform is in one piece.

The preform can be made in one or more layers and can be produced from plastics that are suitable for the stretch-blow-molding method. It is understood that the plastics that are used must also be suitable for the respective production process of the preform, i.e., either injection molding, impact extrusion or extrusion blow molding. Because of the multiple layers, barrier properties of the preform can be improved by, for example, EVOH or polyamide being arranged between the inner wall and outer wall of the preform.

In an exemplary variant of the disclosure, the preform includes plastics selected from the group that consists of, for example, PET, PET-G, HDPE, PP, PS, PVC, PEN, copolymers of the cited plastics, bioplastics, such as, for example, PLA, PEF, or PPF, filled plastics, plastics with one or more copolymer(s) and mixtures of the above-mentioned plastics. The properties of the above-mentioned plastics, as well as their suitability and advantageousness for the production of plastic containers of various types, are known and for the most part have also already been quite well tested.

According to another exemplary configuration of the disclosure, the preform bottom can have a projecting area at a predetermined spot. This projecting area can be used as a material supply if there is not enough material between the inner surface of the preform bottom that is curved in a three-dimensionally convex manner and the outer surface of the preform bottom that is curved in a three-dimensionally convex manner to achieve a uniform container bottom thickness distribution in the container bottom. Analogously to the set-back areas, the projecting areas can be configured as points or beads. The projecting area can be designed outside of the apex. In contrast to the set-back area, the projecting area projects over the inner surface of the preform bottom that is curved in a three-dimensionally convex manner and/or the outer surface of the preform bottom that is curved in a three-dimensionally convex manner.

According to another exemplary configuration of the disclosure, a plastic container with a container body, whose one longitudinal end is closed with a container bottom and whose other longitudinal end has a container neck. The plastic container can be produced in a stretch-blow-molding process from a preform as already described, whereby at the transition to the container body, the container bottom has a wall thickness that is essentially the same or greater than a wall thickness of the container body. In general, the transition between container bottom and container body represents the base of the container, which can be circumferential, as is the case in the so-called champagne bottom, or can be subdivided into feet, as is the case in petaloid feet. Via the proposed configuration of the preform bottom, the container bottom can be configured in the transition (e.g., in general in the area of the base, or foot), in such a way that where in general the maximum stretching takes place, it has the same wall thickness as the adjoining areas from the bottom area and the container body. Moreover, if desired or necessary, the preform bottom can be configured in such a way that the container bottom in the transition has a greater wall thickness than the adjoining areas from the container bottom and the container body.

The plastic container can, for example have a longitudinal stretching ratio of >1.3 that is measured over its axial extension. Plastic containers that are produced from the preform according to the disclosure can have a smaller weight without, in this case, concessions having to made on the stiffness or the barrier properties. Of course, the plastic container that is stretch blow molded from the proposed preform can be combined with the above-described or other technologies that are known from the state of the art in order to configure the bottom of the plastic container in an even more flexible manner to offset, for example, a still greater change in volume after filling and closing of the plastic container and thus to allow even higher filling temperatures.

According to another exemplary configuration of the disclosure, in the case of the proposed plastic container, at least one set-back area, without undercuts, of the preform bottom in an area of thinner wall thickness on the container bottom and at least one partial area of the outer wall and/or the inner wall of the preform bottom in an area of the container bottom of thicker wall thickness in comparison to the area of thinner wall thickness result. By the preform already having a certain "preliminary configuration" of the preform bottom for the thin spots and optionally thick spots that are desired on the stretch-blow-molded container bottom, the material shift or material distribution can be controlled in a targeted manner during the stretch-blow-molding method. During stretch blow molding at the previously determined areas, the container bottom can achieve greater or smaller wall thicknesses; unnecessary material accumulations, which, moreover, can have barrier properties and/or strengths that are inadequate because of insufficient stretching, can in this way be very easily avoided.

According to another exemplary configuration of the disclosure, at least one circumferential set-back area, without undercuts, of the preform bottom forms a thin spot that is configured as a hinge in the container bottom of the plastic container, by which a partial area, which is designed like a membrane, of the container bottom is connected with surrounding areas of the container bottom. Here, in the container bottom, the plastic container can have at least one area that is designed like a membrane, which area is connected via thin spots, which are configured as a hinge, to surrounding areas of the container bottom. The membrane-like area of the container bottom thus has a certain axial movability and can thus compensate for an underpressure or an overpressure inside the plastic container. As a result, a deformation of the container body can be avoided.

In another exemplary variant embodiment of the plastic container, the container bottom can have two or more areas with reduced wall thickness, which areas are arranged concentrically or in the shape of a star. In the case of the concentric arrangement of the bottom areas with reduced wall thickness, the latter can then, for example, have a greater wall thickness in an area that is further removed from the center than in an area that is closer to the center. As a result, the container bottom can have a gradually flexible area. As such, in the case of an underpressure in the interior of the container, first, for example, an area of the container bottom that is closer to the center tilts inward, while further outlying areas are only retracted with increasing underpressure. In the case of an overpressure that is present in the container, a bulging of the flexible area of the container bottom can be carried out in a similar form. In the case of a star-shaped and for example, symmetrical arrangement of the bottom areas with reduced wall thickness, the latter form thin spots, configured as a hinge, in the container bottom, which thin spots ensure the desired flexibility of sectors of the container bottom, in which the container bottom can be divided by the star-shaped design of the bottom areas with reduced wall thickness.

In another exemplary variant embodiment of a plastic container that is produced from a preform that is configured according to the disclosure, the container bottom has feet that are configured in a petaloid manner, on which a thick spot is formed. The thick spot has a greater wall thickness, at least in places, than an area of the container bottom that is surrounded by the feet. In this case, the feet have defined thick spots, which, on the one hand, result from a corresponding configuration of the preform bottom and, on the other hand, are a result of a material shift during stretch blow molding. Such feet have an improved strength and stability compared to the feet that are produced in the known ways and that often have a wall thickness that is too small. Also, the barrier properties in the area of the feet of a plastic container that is produced from a preform that is configured according to the disclosure are improved.

A preform depicted in FIG. 1 bears the overall reference number 1. The preform 1 has a preform body 2 that is configured in an elongated manner and whose one longitudinal end is closed with a preform bottom 3 and whose other longitudinal end adjoins a transition area 25, to which a preform neck 4 with an opening 5 connects. The preform neck 4 can have means, not depicted in more detail, on its outer wall for a positive connection with a closure that is likewise not depicted. Such means can be, for example, threaded passages, threaded sections, projections for a bayonet closure, or corresponding counterparts thereof in the form of ridge-like recesses and the like. The transition area 25, which is also named preform shoulder, and the preform neck 4 can be separated from one another by, for example, a radially projecting, flange-like transfer ring 6, which can be used to transport and support the preform 1 in a stretch-blow-molding unit. It is understood, however, that the preform does not necessarily have to have a transfer ring. In the preform shoulder 25, the preform 1 has a wall thickness, which, in the deformation of the preform 1 in a stretch-blow-molding method to form a container, has the effect that plastic material is drawn off from the shoulder area into the other areas of the container. As a result, it can be achieved that the container body has a wall thickness that is constant to a large extent below the neck area. In this case, the formation and distribution of the wall thickness in the preform shoulder 25 depends on the shaping and size of the container that is to be produced from the preform 1. The wall thickness of the preform 1 thus increases in the area of the preform shoulder 25 from the preform neck 4 to the preform body 2. As a result, due regard is paid to the circumstance that the areas that are closer to the preform neck 4 during blow molding are less radially stretched than the areas that are farther away. The increasingly greater radial extension is compensated by the increase in wall thickness from the preform neck 4 in the direction of the preform body 2. The container shoulder that is stretch blow molded from the preform shoulder 25 thereby to a large extent has the same wall thickness over its axial extension.

The preform bottom 3 that closes one longitudinal end of the preform body 2 is configured as a flat bottom according to the depicted embodiment. As a flat bottom in terms of this patent application, in this case reference is made to a preform bottom 3, which has a first radius of curvature R1 in a transition area from preform body 2 to preform bottom 3, which radius is smaller than a second radius of curvature R2 of the other preform bottom 3. A maximum outer diameter D of the preform bottom 3, which is usually present in the transition of the preform body 2 to the preform bottom 3, is in this case larger than an axial height H of the preform bottom 3, which extends axially from an apex S of the preform bottom 3 up to the transition of the preform bottom 3 into the preform body 2. In this case, the first radius of curvature R1 is smaller than the axial height H of the preform bottom 3. The preform bottom 3 has an outer wall 31 and an inner wall 32, which delimit a bottom thickness b. The inner wall 32 extends along an inner surface E2 that is curved in a three-dimensionally convex manner, and the outer wall 31 extends along an outer surface E1 that is curved in a three-dimensionally convex manner. The inner surface E2 that is curved in a three-dimensionally convex manner and the outer surface E1 that is curved in a three-dimensionally convex manner are spaced apart from one another in such a way that the distance from the apex S of the outer surface E1 that is curved in a three-dimensionally convex manner and the apex S' of the inner surface E2 that is curved in a three-dimensionally convex manner to the preform body 2 continuously increases. Thus, the bottom thickness b continuously increases from the apexes S, S' to form a transition 8 from the preform bottom 3 to the preform body 2. This transition 8 thus forms the thickest spot on the preform 1.

A wall thickness w of the preform body 2 is delimited by an outer wall 21 and an inner wall 22 of the preform body 2. In this embodiment, the outer wall 21 and the inner wall 22 of the preform body are straight, whereby the wall thickness w beginning from the transition 8 from the preform bottom 3 to the preform body 2 with the bottom thickness b continuously tapers toward the preform shoulder 25. On a finished stretch-blow-molded container 11, this transition 8 also forms the transition of a container bottom 13 to a container body 12, as can be seen better in FIG. 5. Also, the preform bottom 3 forms the container bottom 13, the preform body 2 forms the container body 12, and the preform shoulder 25 forms a container shoulder 125.

Figure 2:
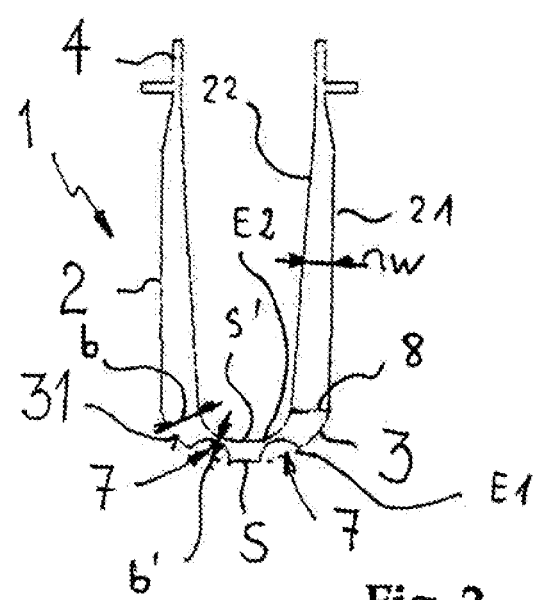
FIG. 2 shows the exemplary preform from FIG. 1 with a set-back area without undercuts on an outer wall of a preform bottom.

FIG. 2 shows the preform 1 that is known from FIG. 1 with a set-back area 7 without undercuts on an outer wall 31 of the preform bottom 3. This set-back area 7 without undercuts has a reduced bottom thickness b' compared to an area of the outer wall 31 that adjoins the set-back area 7 without undercuts. In this embodiment, the set-back area 7 without undercuts extends in an annular manner concentrically around the apex S and spaced apart from the latter.

Also here, the inner wall 32 of the preform bottom 3 extends along an inner surface E2 that is curved in a three-dimensionally convex manner, and the outer wall 31 of the preform bottom 3 extends along an outer surface E1 that is curved in a three-dimensionally convex manner. The inner surface E2 that is curved in a three-dimensionally convex manner and the outer surface E1 that is curved in a three-dimensionally convex manner are spaced apart from one another in such a way that the distance from the apex S of the outer surface E1 that is curved in a three-dimensionally convex manner and the apex S' of the inner surface E2 that is curved in a three-dimensionally convex manner to the preform body 2 continuously increases. The absence of undercuts of the set-back area 7 makes it easy to demold the preform from a cavity. Expensive hollow cores or separable tool molds can be eliminated. In the case of a preform 3 that is produced in the injection-molding method, the crown S can coincide with the feed point. The latter usually has a greater wall thickness, which is for reasons of manufacturing.

In the case of a known preform, the excess material found there is only slightly thinned and stretched in the subsequent stretch-blow-molding method. Correspondingly, this undesirable material accumulation can form a weak spot of a plastic container that is stretch blow molded from the preform with respect to barrier properties and strength. With a preform 1 that is configured according to FIG. 2 with a set-back area 7 without undercuts that extends in an annular manner around the crown S, these drawbacks can be counteracted. During the subsequent stretch-blow-molding method, plastic material is "removed" from the crown S, which at the same time forms the feed point of the preform 1, because of the set-back area 7 without undercuts. The preform bottom 3 is thus also better stretched in its crown S. As a result, better barrier properties and strengths can be achieved in the entire preform bottom 3. In this case, as an additional use, excess plastic material can also be saved.

Figure 3:
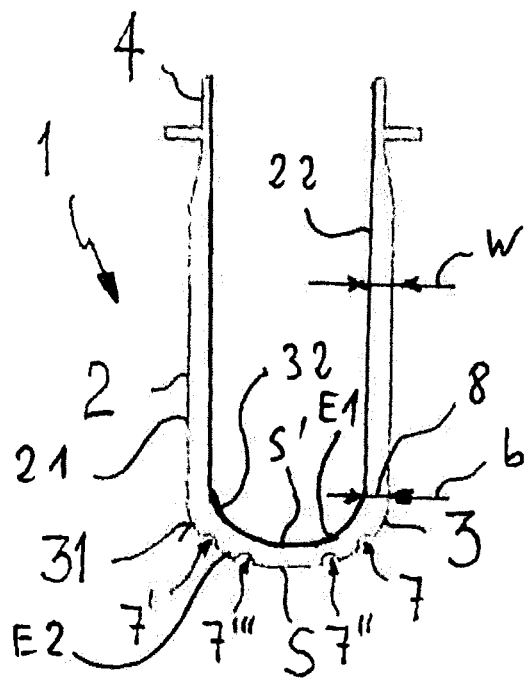
FIG. 3 shows another exemplary configuration of a preform according to the disclosure with set-back areas without undercuts on an outer wall of a preform bottom in an axial cutaway view.

FIG. 3 shows another embodiment of a proposed preform 1 with set-back areas 7, 7', 7" and 7''' without undercuts on the outer wall 31 of the preform bottom 3. A number of set-back areas 7, 7', 7", 7''' without undercuts are made in the outer wall 31 of the preform bottom 3. The set-back areas 7, 7', 7", 7''' without undercuts can be areas that are isolated from one another and that can be arranged at least in part along an annular area of the preform bottom 3. The set-back areas 7, 7', 7", 7''' without undercuts that are arranged along an annular area of the preform bottom 3 then have the same radial distance from the crown S of the preform bottom 3.

As an alternative, the set-back areas 7, 7', 7", 7''' without undercuts can also be configured as concentrically closed circumferential ridges or grooves in the outer wall 31 of the preform bottom 3, whereby the crown S of the preform bottom can be arranged, for example, in the center. Correspondingly, then, the set-back area 7 without undercuts and the set-back area 7' without undercuts as well as the set-back area 7" without undercuts and the set-back area 7''' without undercuts in each case are connected to one another. Specifically, the forming with multiple closed circumferential set-back areas without undercuts in the outer wall 31 of the preform bottom 3 results in film-hinge-like areas in the container bottom, as is described in more detail in FIG. 8. Also, the set-back areas 7, 7', 7", 7''' without undercuts can also extend in a star-shaped manner into the preform bottom 3. The wall thickness w of the preform body 2 is delimited by the outer wall 21 and the inner wall 22 of the preform body 2. In this embodiment, the outer wall 21 and the inner wall 22 of the preform body 2 are straight and extend essentially parallel to one another up to the preform shoulder 25. Thus, the wall thickness w is essentially constant over the preform body 2 beginning from the transition 8 of the preform bottom 3 to the preform body 2 with the maximum bottom thickness b and thus essentially corresponds to the maximum bottom thickness b.

Figure 4:
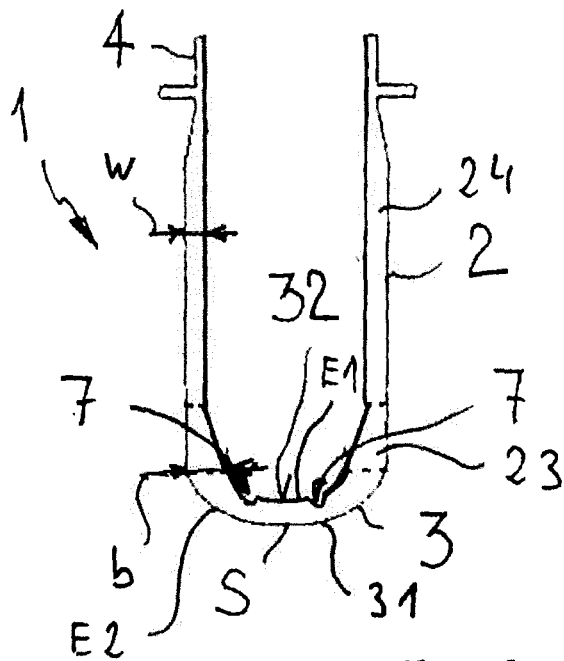
FIG. 4 shows another exemplary configuration of a preform according to the disclosure with a set-back area without undercuts on an inner wall of a preform bottom in an axial cutaway view.

In the further embodiment, depicted in FIG. 4, of the preform 1, a set-back area 7 without undercuts is formed in an inner wall 32 of the preform bottom 3. The set-back area 7 without undercuts is designed in an annular manner in this embodiment and in turn is configured in such a way that it is without undercuts. As a result, an easy demolding of the preform 1 from the mold, for example, of an injection-molding unit or an impact-extrusion unit is ensured. Hollow cores of complicated configuration or the like can also be eliminated here.

In a variant embodiment of the preform, not shown, the set-back area 7 without undercuts can also be provided right next to the crown S of the preform bottom 3 in the inner wall 32 of the preform bottom 3. Also here, the transition 8 forms the thickest spot on the preform 1. A wall thickness w of the preform body 2 is delimited by the outer wall 21 and the inner wall 22 of the preform body 2. In this embodiment, the outer wall 21 and the inner wall 22 of the preform body are straight. The wall thickness w beginning from the transition 8 from the preform bottom 3 to the preform body 2 with the maximum bottom thickness b tapers into a first partial area 23 that adjoins the transition 8, in order then to stretch in an essentially constant manner into the second partial area 24 that adjoins the first partial area 23 and the preform shoulder 25.

Exemplary preforms according to the disclosure have been explained in the example of preforms that have flat bottoms. It is understood, however, that the configuration of the preform according to the disclosure can also be provided with a, for example, dome-shaped or bomb-shaped preform bottom. The configuration of the preform bottom according to the disclosure can even be provided in the case of preforms that have a preform bottom that is turned over in the direction of the opening of the preform. The set-back areas without undercuts can be provided on the outer wall or on the inner wall of the preform bottom. Combinations of set-back areas without undercuts that are arranged on the outer wall and on the inner wall of the preform bottom are also possible. A minimum wall thickness of the set-back areas without undercuts in the preform bottom is, for example, always at least approximately 0.7 mm to 4 mm, in order to meet the specifications of the injection-molding method, which is the production method that is used most often for the production of preforms.

The production of the preforms with a preform bottom that is configured according to the disclosure can be carried out, for example, with injection molding or with impact extrusion, by a correspondingly designed mold being used with projections in places and/or annular projections. As an alternative, a known preform, which usually has an unstructured bottom, can also be provided by mechanical deformation with one or more reduced-wall-thickness areas without undercuts. Mechanical deformation of the preform bottom connected to injection molding or impact extrusion or even extrusion blow molding can be carried out by, for example, embossing or else cutting.

The preform can be made in at least one or more layers and can be produced from plastics that are suitable for the stretch-blow-molding method. It is understood that the plastics that are used must also be suitable for the respective production process for the preform, i.e., either injection molding, impact extrusion or extrusion blow molding. In this case, the preform can include PET, PET-G, HDPE, PP, PS, PVC, PEN, copolymers of the cited plastics, bioplastics, such as, for example, PLA, PEF or PPF, filled plastics, plastics with one or more copolymer(s) and mixtures of the above-mentioned plastics. The plastics or parts thereof can be dyed and/or coated.

Figure 5:
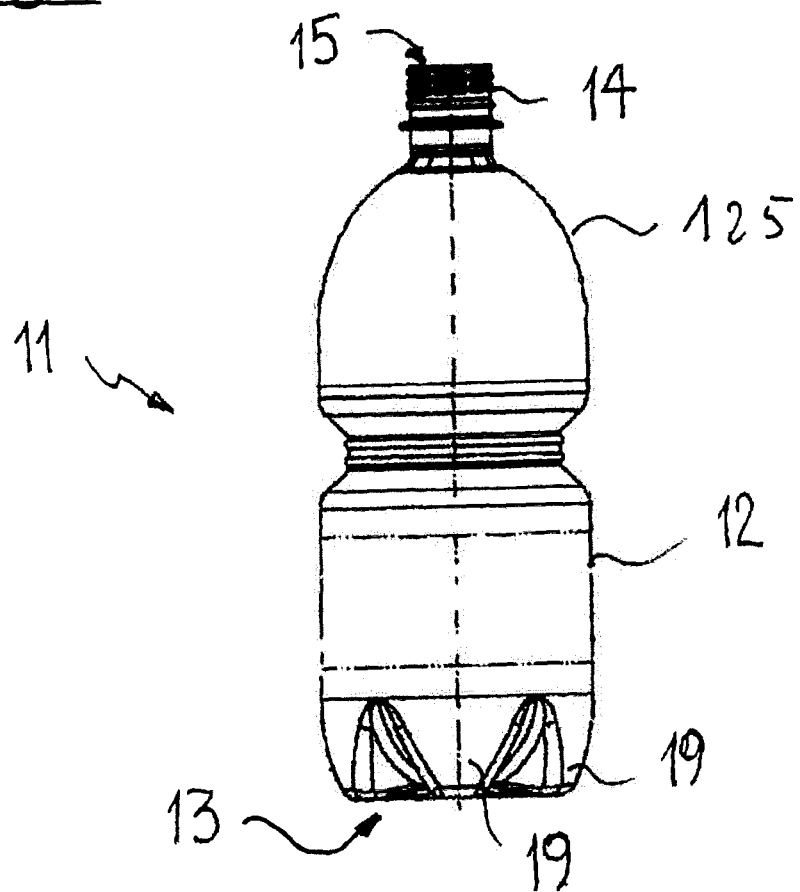
FIG. 5 shows a side view of a plastic container, stretch blow molded from an exemplary preform according to the disclosure, with a container bottom with petaloid feet.

FIG. 5 diagrammatically shows a side view of an exemplary stretch-blow-molded plastic container, which is stretch blow molded from an above-described preform and bears the overall reference number 11. The plastic container 11 has a container body 12 with a container bottom 13. A container shoulder 125, which connects a container neck 14 to a pour opening 15, connects to the end of the container body 12 that is opposite to the container bottom 13. The container bottom 13 has, for example, a number of petaloid-shaped feet 19. The plastic container has a longitudinal stretching ratio of >1.3 that is measured over its axis. At the transition to the container body, the container bottom 13 has a wall thickness that is essentially greater than or equal to a wall thickness of the container body 12.

Figure 6:
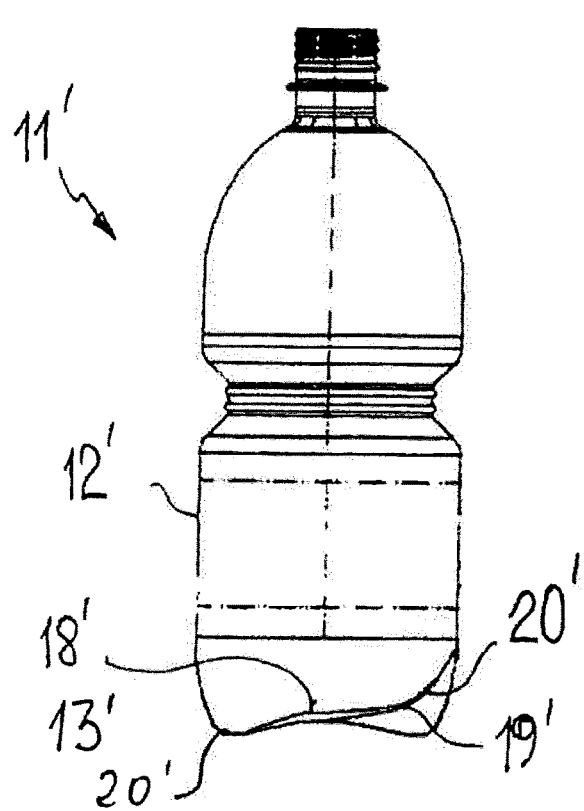
FIG. 6 shows an axial cutaway view of a plastic container that is produced from a known preform.

FIG. 6 shows a diagrammatic axial section of a plastic container 11', which is stretch blow molded from a known preform. Due to the process, a container bottom 13' has a thick spot in a central area 18', which in the case of an injection-molded preform corresponds, for example, to the area around the feed point. At this thick spot, the container bottom 13' is only inadequately stretched. In contrast, the petaloid feet 19' have very thin-walled areas 20', which can result in a reduced strength of the container bottom 13' compared to the container wall 12'.

Figure 7:
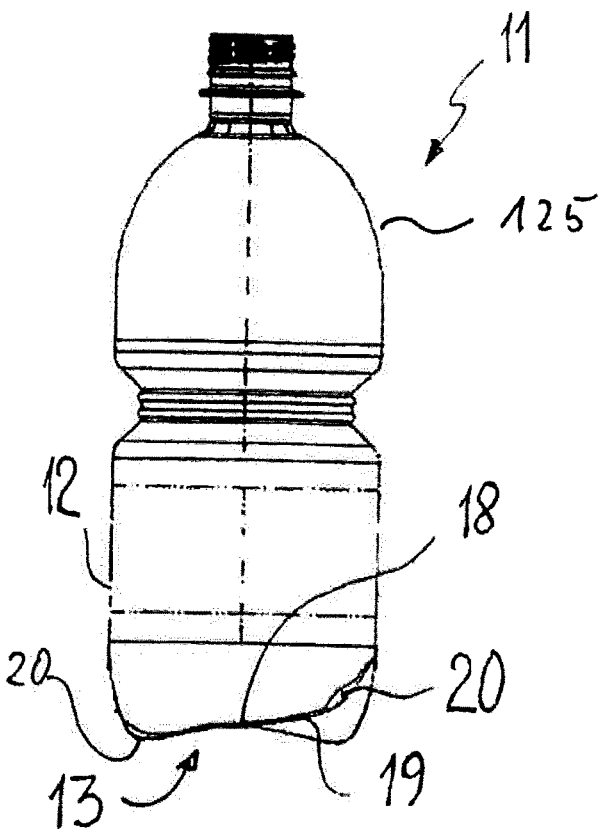
FIG. 7 shows an axial cutaway view of an exemplary plastic container that is produced from a preform according to FIG. 1.

FIG. 7 shows an axial cutaway view of an exemplary plastic container 11, which is stretch blow molded from a preform according to FIG. 1. The continuous increase in wall thickness b of the preform bottom 3 has the effect that, during the stretch-blow-molding process, the container bottom 13 has a wall thickness that is greater than or equal to a wall thickness of the container body 12. In this embodiment, the wall thickness in particular at the transition from the container bottom 13 into the container body 12 is greater than the wall thickness of the container body 12. In this connection, said transition forms a base, or petaloid foot, of the container 11. The increased wall thickness at the transition produces a thick spot 20 in the case of the petaloid feet 19. In this case, the thick spot 20 is formed, for example, at the spot of the feet 19 that in the case of the production of the plastic container from a known preform would result in forming a thin spot (reference number 20' in FIG. 6).

Figure 8:
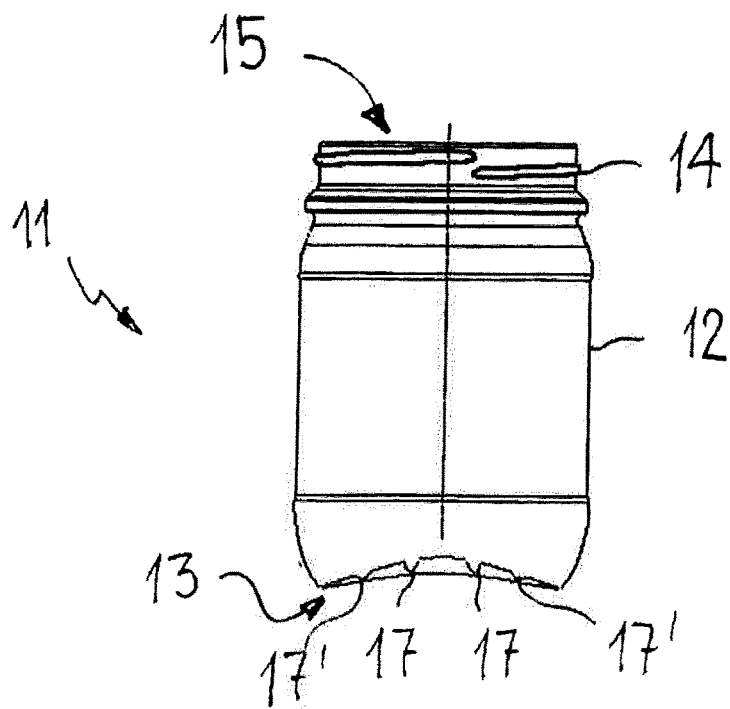
FIG. 8 shows an axial cutaway view of another exemplary variant of a plastic container that is produced from a preform according to FIG. 3.

FIG. 8 shows another exemplary variant embodiment of a plastic container 11, which is produced from a preform according to FIG. 3 with two concentric annular circumferential set-back areas without undercuts in the preform bottom in a stretch-blow-molding method. The plastic container has a container body 12 whose one longitudinal end is closed with a container bottom 13. On the other longitudinal end of the container body 12, a container neck 14 connects to an opening 15. Because of the two concentric annular circumferential set-back areas 7, 7' without undercuts that are made on the preform bottom 3, two concentric annular circumferential thin spots 17, 17' are formed on the container bottom 13, which spots form film-like hinges. The thickness of the film-like hinges is between 0.15 mm and 1.5 mm. Between the film-like hinges, movable membrane-like partial areas 131 of the container bottom extend essentially along a container extension direction, which partial areas can compensate for an underpressure or else an overpressure that occurs in the closed container 11.

Figure 9:
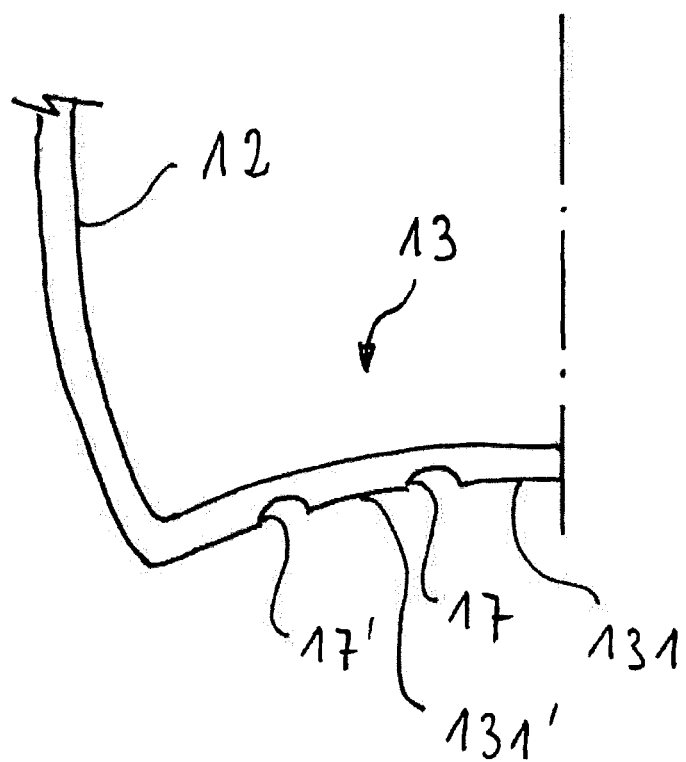
FIG. 9 shows an enlarged view of the container bottom from FIG. 8 in an axial cutaway view.

FIG. 9 shows an enlargement of a cutaway of the container bottom 13 that is depicted in FIG. 8 with its film-like hinges 17, 17' and the partial areas 131, 131' of the container bottom 13 that are configured as a membrane.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A preform for production of a plastic container in a stretch-blow-molding method, the preform comprising:
an elongated, tubular preform body, which is closed with a preform bottom on one of its longitudinal ends and whose other longitudinal end adjoins a transition area, to which a preform neck connects, whereby the preform bottom has an outer wall and an inner wall, which delimit a bottom thickness (b), whereby the preform body has an outer wall and an inner wall that delimit a wall thickness (w), wherein:
an inner surface (E2) of the preform bottom is curved in a three-dimensionally convex manner and an outer surface (E1) of the preform bottom is curved in a three-dimensionally convex manner, the inner surface (E2) and the outer surface (E1) are spaced apart from one another such that the bottom thickness (b) from their respective apex (S, S') to the preform body continuously increases, whereby an extension of the outer wall of the preform bottom along the outer surface (E1) is interrupted by a wall thickness reduced set-back area outside of the apex (S) thereof, and/or an extension of the inner wall of the preform bottom along the inner surface (E2) is interrupted by a wall thickness reduced set-back area outside of the apex (S') thereof, wherein the continuously increasing bottom thickness (b) resumes in a direction from the apex to the preform body after the interruption by the wall thickness reduced set-back area outside of the apex (S'), and each wall thickness reduced set-back area is arranged entirely in the preform bottom and wherein the preform bottom has the wall thickness reduced set-back area in areas that are to be designed as thin spots of a container bottom of the plastic container and wherein bottom areas of the preform with greater wall thickness result in thick spots on the container bottom, wherein the thick spots are stiffer than the thin spots.

2. The preform according to claim 1, wherein the preform bottom is shaped as a flat divergent lens, whereby the flat divergent lens is bound by the outer wall and the inner wall of the preform bottom.

3. The preform according to claim 1, wherein the wall thickness (w) is continuously reduced from the bottom thickness (b) on the preform body up to the transition area.

4. The preform according to claim 1, wherein the wall thickness (w) is essentially constant from the bottom thickness (b) on the preform body up to the transition area.

5. The preform according to claim 1, wherein a first partial area of the preform body adjoins the preform bottom, and a second partial area of the preform body adjoins the first partial area and the transition area, whereby a wall thickness (w) of the first partial area is continuously reduced from the bottom thickness (b) in the preform body up to the second partial area, and a wall thickness (w) in the second partial area is essentially constant and essentially corresponds to the wall thickness (w) of the first partial area in the transition to the second partial area.

6. The preform according to claim 1, wherein the set-back area along the outer surface (E1) and/or the set-back area along the inner surface (E2) of the preform bottom has no undercuts, whereby a wall thickness (b') of the wall thickness reduced set-back area along the outer surface (E1) and/or the wall thickness reduced set-back area along the inner surface (E2) without undercuts is reduced compared to the bottom thickness (b) of an area of the outer wall and/or inner wall that adjoins the area without undercuts.

7. The preform according to claim 6, wherein the wall thickness (b') of the wall thickness reduced set-back area along the outer surface (E1) and/or the wall thickness reduced set-back area along the inner surface (E2) is 0.7 mm to 4 mm.

8. The preform according to claim 6, wherein the wall thickness reduced set-back area along the outer surface (E1) and/or the wall thickness reduced set-back area along the inner surface (E2) without undercuts is a line-recess and annular and arranged centrically around the apex.

9. The preform according to claim 8, wherein the line-recess is a groove.

10. The preform according to claim 6, wherein the preform bottom has multiple set-back areas without undercuts, the multiple set-back areas without undercuts are arranged at least partially along a closed ring in the preform bottom.

11. The preform according to claim 6, wherein the preform bottom has multiple set-back areas without undercuts, and at least one of the multiple set-back areas without undercuts is annular.

12. The preform according to claim 11, wherein the preform bottom has at least two set-back areas without undercuts that are annular and that are arranged concentrically in the preform bottom.

13. The preform according to claim 6, wherein the preform bottom has at least two set-back areas without undercuts, the at least two set-back areas without undercuts are arranged in a star-shaped manner.

14. The preform according claim 1, wherein the preform is one of an injection molded preform, a blow molded preform, an impact extruded preform, or an extrusion blow molded preform with a mechanically deformed preform bottom.

15. The preform according to claim 1, comprising:
one or more layers manufactured from plastics that are suitable for the stretch-blow-molding method.

16. The preform according to claim 15, wherein the plastics are selected from the group that consists of polyethylene terephthalate (PET), polyethylene terephthalate glycol (PET-G), high density polyethylene (HDPE), polypropylene (PP), polystyrene (PS), polyvinyl chloride (PVC), polyethylene naphthalate (PEN), copolymers of the foregoing plastics, bioplastics, polylactic acid (PLA), poly(ethylene 2,5-furanoate) (PEF) or poly(propylene 2,5-furanoate) (PPF), filled plastics, plastics with one or more copolymer(s) and mixtures of the foregoing plastics.

17. The preform according to claim 1, wherein the preform bottom comprises:
a projecting area at a predetermined spot.

* * * * *